(No Model.) 3 Sheets—Sheet 1.
S. S. INGMAN.
SHINGLE EDGING AND SIZING MACHINE.
No. 539,740. Patented May 21, 1895.
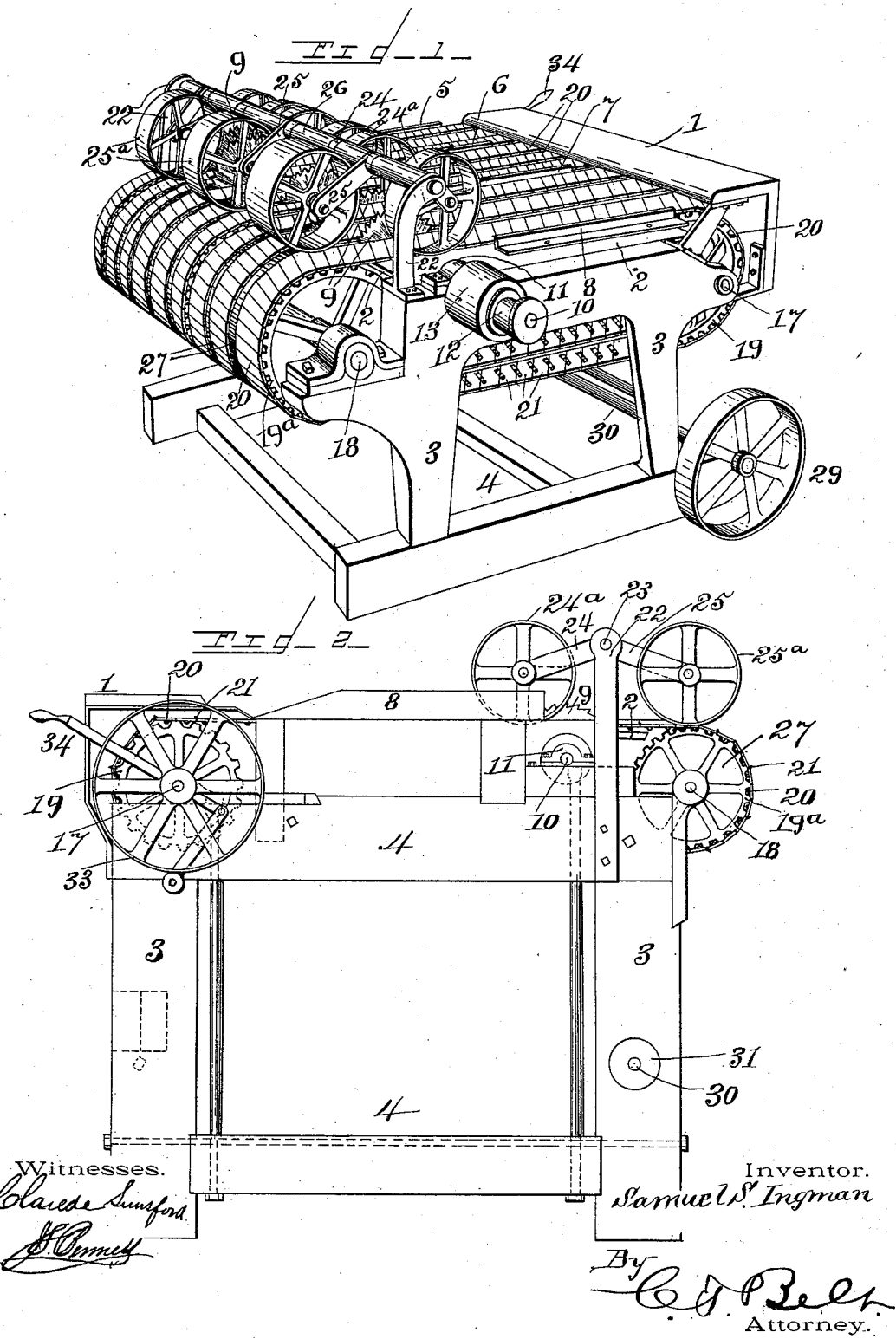
Witnesses.
Claude Sunsford
S. Pennell
Inventor.
Samuel S. Ingman
By C. J. Bell
Attorney.
THE NORRIS PETERS CO., PHOTO-LITHO., WASHINGTON, D. C.

(No Model.) 3 Sheets—Sheet 2.
S. S. INGMAN.
SHINGLE EDGING AND SIZING MACHINE.
No. 539,740. Patented May 21, 1895.
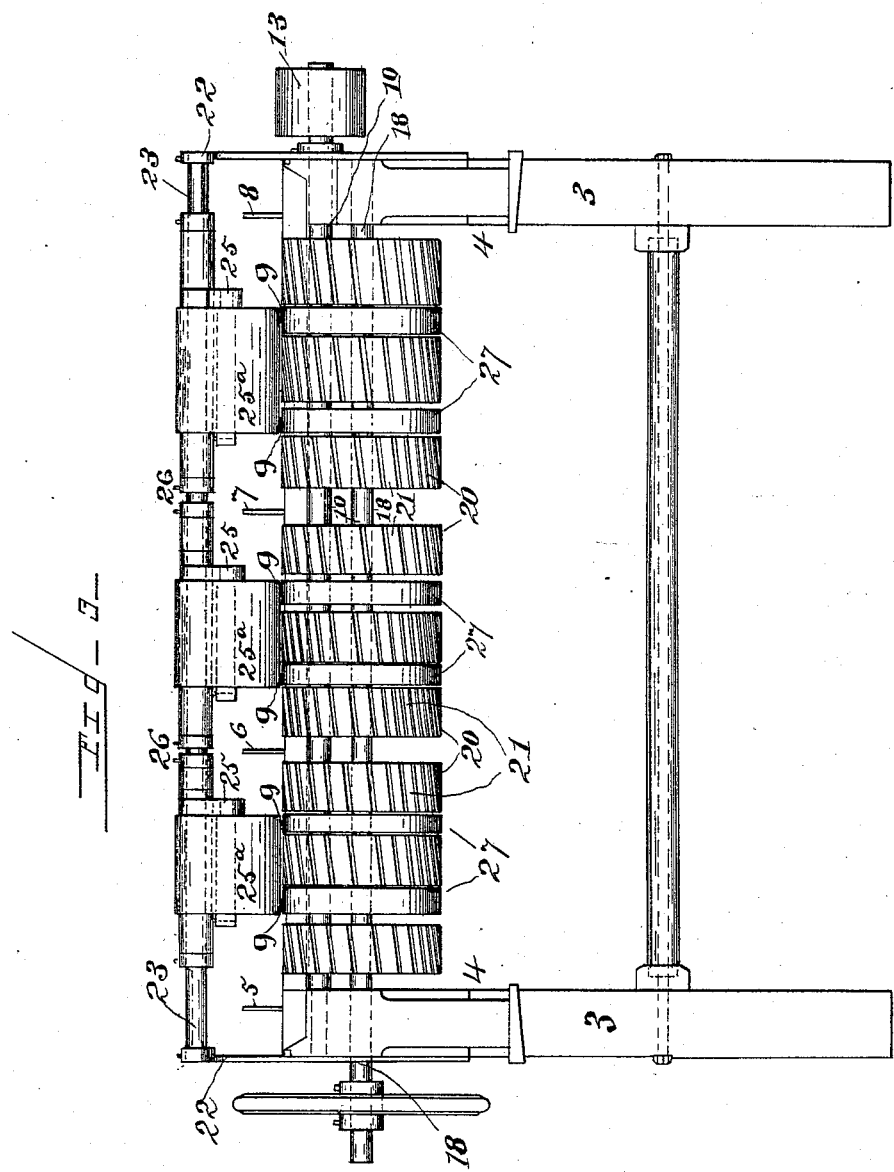
Witnesses.
Inventor.
Samuel S. Ingman
By
Attorney.

(No Model.) 3 Sheets—Sheet 3.
S. S. INGMAN.
SHINGLE EDGING AND SIZING MACHINE.
No. 539,740. Patented May 21, 1895.
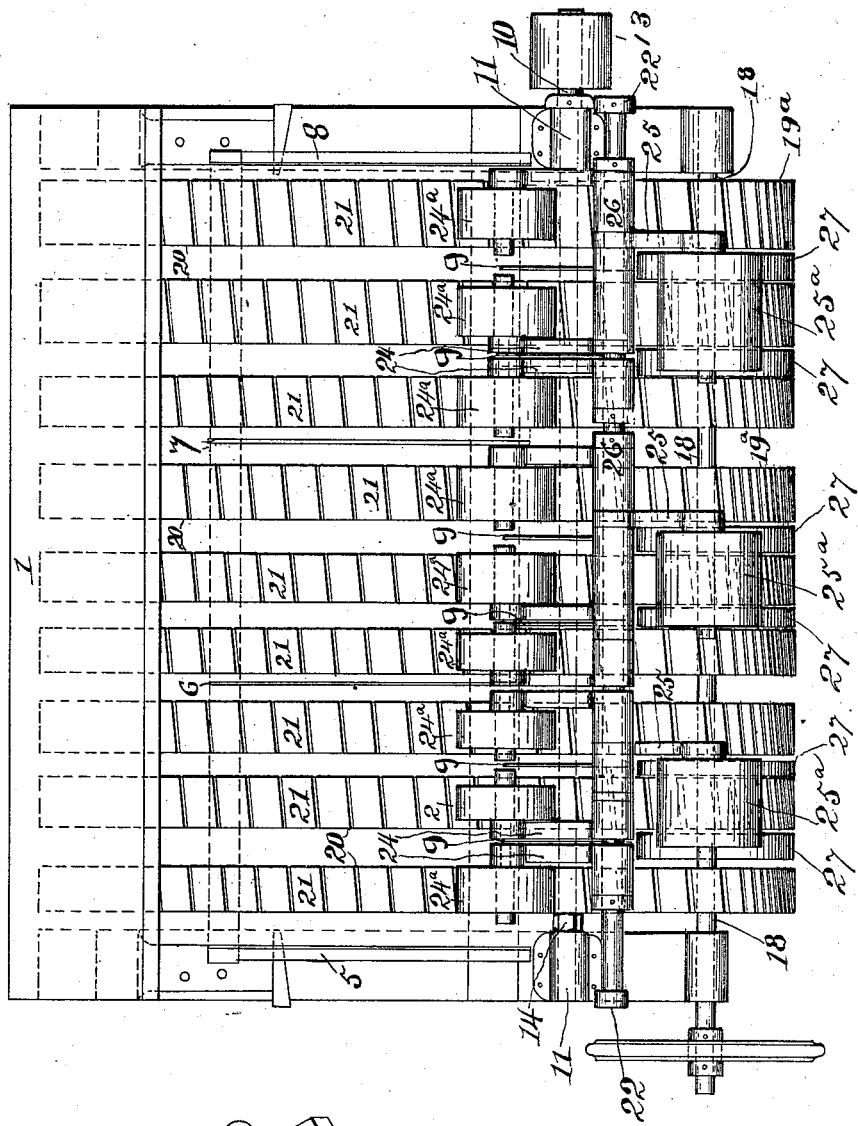
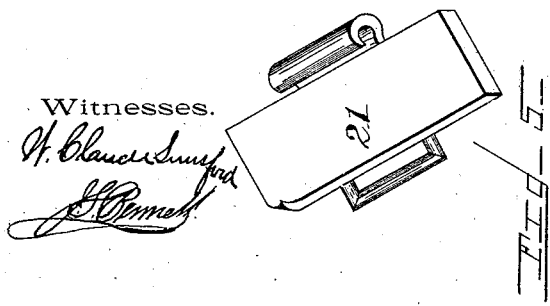
Witnesses.
Inventor.
Samuel S. Ingman
By
Attorney.

UNITED STATES PATENT OFFICE.

SAMUEL S. INGMAN, OF ALEXANDRIA, LOUISIANA.

SHINGLE EDGING AND SIZING MACHINE.

SPECIFICATION forming part of Letters Patent No. 539,740, dated May 21, 1895.

Application filed November 10, 1894. Serial No. 528,404. (No model.)

*To all whom it may concern:*

Be it known that I, SAMUEL S. INGMAN, a citizen of the United States, residing at Alexandria, in the parish of Rapides and State of Louisiana, have invented certain new and useful Improvements in Shingle Edging and Sizing Machines, of which the following is a specification.

My invention relates to a shingle sawing machine, and particularly to a shingle edging or sizing machine.

In order to turn out a six by eighteen inch shingle from a random shingle mill, a log is placed upon a slide, cut off by a drag saw, bolted into six inch blocks cut by a circular saw, or cut into "cants" by a saw mill, and into blocks with cut off saw, passed to a shingle saw machine, where "dimension" shingles are cut, and caused to drop into bins according to the grade of each shingle, while such as are defective, or from some cause will not make a six inch shingle, are passed through a knot saw or jointer machine, and reduced to smaller dimensions.
Shingles from my machine are treated by the aforesaid drag saw machine from the log slide, but when the bolter is reached the blocks are cut twelve by eighteen inches, or large enough to make two shingles six by eighteen inches, then through the said shingle sawing machine, and finally (the knot or jointer machine being entirely dispensed with) through my edging or sizing machine, thus producing two shingles six by eighteen instead of one of equal size.

The object of the invention is to provide a shingle edging and sizing machine of such improved construction and arrangement of parts that it will edge and size a much larger shingle than the machines now in use, and will size up the shingle pieces cut from larger blocks making one or more "dimension" shingles without the customary loss of timber.

The uniform width of shingles produced by the majority of mills or machines, is four, five and six inches, and the carriages of the machines now in use will generally cut a twelve inch, or wider shingle. A further object therefore of my invention is to provide means for edging a shingle piece wide enough to make two shingles of either of the said uniform dimensions, and at the same time size them.

A further object of my invention is to provide a machine to size each shingle separately, and to work off the defective unsized shingles to useful dimensions without the use of a knot or jointer machine.

A further object of the invention is to provide a simple, certain, and inexpensive chain feed mechanism, whereby the shingles are carried or pushed without the least possibility of their being caught or stopped in their travel through the machine.

A still further object of the invention is to provide an auxiliary feed of rollers and pulleys to take the sized shingles from the machine, and take the splinters from the saws, and prevent them from flying back at the operator.

The invention consists in the novel construction and arrangement of parts as will be hereinafter more fully described and set up in the claims.

In the accompanying drawings, forming part of this application, Figure 1 is a perspective view of my improved shingle-edging machine. Fig. 2 is an enlarged side elevation thereof, showing a simplified form of frame. Fig. 3 is a rear end view of Fig. 2. Fig. 4 is a top plan view of Fig. 2. Fig. 5 is a perspective view of one of the plates with one of the forward corners turned up.

The same numeral references denote the same parts throughout the several figures of the drawings.

The front of the machine is provided with a right angle rest 1, from whence the wide and unsized shingles are fed on to the stationary table 2, the latter being secured upon two supports 3, from the machine 4. Suitably secured upon the table and at proper distances apart, are four gages 5, 6, 7, and 8, which extend from the front end of the table to, and upon one side of each circular saw 9.

The shaft or saw arbor 10, is journaled in boxes 11, upon the frame 4, has a shoulder 12, and pulley 13, at one end. The other end is screw threaded and has a nut 14, for the purpose of tightening up the saws, of which there are 6 (this number being lessened or increased as desired) secured upon the shaft or arbor between a series of collars. The peripheries of these saws project through the table 2, a sufficient distance to insure perfect cutting.

In the front of the machine is journaled the shaft 17, and at the rear or opposite end of the machine is similarly journaled a like shaft 18. Upon each of these shafts is secured a series of sprocket wheels 19, and 19ª, which carry an endless sprocket or chain belt 20. The chain belts 20, are each provided with a series of plates 21, preferably of iron or steel, secured in place on an angle to the belt but parallel to each other, and the forward corner of each plate is turned up to act as a dog and push the shingles through, should they get caught; or plates with a turned corner may be used at intervals through the chain.

Projecting vertically from each side of the frame 4, to which they are firmy secured, are the upright hangers 22, connected together by the shaft 23, having front and rear arms 24, and 25, respectively journaled thereon, with collars 26, filling up the space between the arms. From these arms are independently suspended front, and rear shingle guide rollers 24ª and 25ª, respectively, so that they will not grasp the shingles against the belts 20; the axles of the rear rollers being in the same vertical plane with the axles of the rear sprocket wheels. These rollers with the sprocket chains or belts form the feed mechanism for the shingles while being cut and as the cut is finished the shingles together with the splints and shavings are caught between the said rear rollers and a series or rollers 27, secured upon the shaft 18, (between the sprocket wheels 19ª) and are carried off clear of the machine; thus furnishing an auxiliary feed.

It will be observed that the endless chain belts run over the table between and to the side of the saws, and under the guide rollers, and that the front set or series of these rollers are twice the number of the rear rollers, while the latter are of sufficient width to engage the auxiliary feed rollers.

Motive power is supplied to the machine by means of a belt from an engine or suitable driving power, to the pulley 13, from thence by a belt to the pulley 29, upon one end of shaft 30, then from the pulley 31, upon the other end of the shaft, to the pulley 33, the latter having a hand brake 34. These belts are not shown in order not to confuse the showing of other more important parts. This arrangement may be varied, that is the feed may be driven from a separate counter shaft located under or over the machine, and provided with a sprocket wheel carrying a chain belt.

Supposing the operator to have a twelve inch unsized shingle in hand to size to two six inch shingles, the operation of the machine is as follows: One edge of the said shingle is placed against the gage 8. It is caught by the plates of the sprocket chains, carried under the two front rollers nearest the gage, (said rollers engaging the next plate before disengaging the preceding one, owing to the angled position of the plates of the belts) then under the wide rear rollers and between the latter and the two auxiliary rollers nearest the said gage, the said wide roller engaging the two shingles thus cut, as well as the splinters, keeping them hard down upon the endless belts until the latter carry them off over the rear sprocket wheels.

Having thus described my invention, what I claim as new, and desire to secure by Letters Patent, is—

1. In a shingle machine, the combination with the circular saws, and the table having a series of gages, of a series of rollers independently suspended upon a shaft forward of the saws, a series of rollers independently suspended upon the same shaft in the rear of the saws, the chain belts, and means for running the belts over the table between the saws, and between the said gages, for the purpose set forth.

2. In a shingle machine, the combination with the table, the circular saws revolved through the table, and the series of gages secured upon the table, of the endless chain belts, the front and rear sprocket wheels carrying the belts over the table between the gages, and between the saws, a series of rollers independently pivoted upon a shaft from above the belts and hanging forward of the saws, and a series of rollers, pivoted upon the same shaft, and hanging in the rear of the saws, with their axles in the same vertical plane with the axles of the rear sprocket wheels, for the purpose set forth.

3. In a shingle machine, the combination with the circular saws, and a traveling means such as described for conveying the unsized shingles to the saws, of the two sets of rollers, each set and each roller being independently suspended from one and the same shaft upon each side of the latter, one set engaging the said conveying means forward of the saws, and the other set having the same engagement in the rear of the saws, as set forth.

4. In a shingle sizing machine, the combination with the circular saws and the table having gages, of the sprocket wheels, the chain belts, and the two sets of independently suspended rollers engaging the said chain belts, one set of the said rollers being wider and of less number than the other set, the wide set being in the rear of the saws, and the other set located forward of the saws, substantially as set forth.

5. In a shingle machine, the combination with the table having gages, the circular saws, and the suspended rollers, of the sprocket wheels, the endless chain belts, and the plates secured upon the chains at an angle and having a turned up portion, substantially as set forth.

6. In a shingle machine, the combination with the circular saws, the table having gages, and the suspended rollers, of the sprocket wheels, the auxiliary rollers located between and upon the same shaft with the sprocket wheels, the chain belts, and the plates secured to the said belts, and having a turned up portion, as set forth.

In witness whereof I hereunto set my hand in the presence of two witnesses.

SAMUEL S. INGMAN.

Witnesses:
W. T. TURBEVILLE,
L. SESSIONS.